Aug. 20, 1963   F. K. H. NALLINGER   3,101,007
KNOB ARRANGEMENT, PARTICULARLY FOR MOTOR VEHICLES
Filed Jan. 13, 1958   3 Sheets-Sheet 1

INVENTOR
FRIEDRICH K. H. NALLINGER

BY Dicke & Craig
ATTORNEYS

Aug. 20, 1963   F. K. H. NALLINGER   3,101,007
KNOB ARRANGEMENT, PARTICULARLY FOR MOTOR VEHICLES
Filed Jan. 13, 1958   3 Sheets-Sheet 2

INVENTOR
FRIEDRICH K. H. NALLINGER
BY Dicke & Craig
ATTORNEYS

3,101,007
KNOB ARRANGEMENT, PARTICULARLY FOR MOTOR VEHICLES
Friedrich K. H. Nallinger, Stuttgart, Germany, assignor to Daimler-Benz Aktiengesellschaft, Stuttgart-Unterturkheim, Germany
Filed Jan. 13, 1958, Ser. No. 708,676
Claims priority, application Germany Jan. 19, 1957
5 Claims. (Cl. 74—553)

The present invention relates to an arrangement for actuating change-speed transmissions. More particularly, the present invention is of special importance as a range selector for automatic transmissions of motor vehicles, for example, for hydraulic transmissions.

It is known in the prior art to actuate the change-speed transmission in motor vehicles by a shifting lever which is arranged laterally below the steering wheel at the steering column. It is further known in the prior art to utilize push buttons, particularly for the range selection of automatic transmissions. Both prior art arrangements, however, are disadvantageous. In the first-mentioned arrangement, the driver or passenger may very easily get caught or hung with his sleeve at the shifting lever arranged below the steering wheel which may result in faulty shifting, for example, by pulling out a speed or by delaying the shifting process. On the other hand, push buttons, as used in the second-mentioned prior art devices, may be found by the driver only with difficulty, particularly in darkness. The person actuating the push buttons must thereby look very carefully at the push buttons in order to recognize correctly the one, desired button. As a result thereof, the attention of the driver is unnecessarily distracted from the road ahead and from the traffic, and therewith the danger of accidents is increased.

The present invention aims at an installation for actuating change-speed transmissions, especially automatic transmissions in which an easy and faultless shifting as well as a satisfactory unobjectionable recognition of the engaged position is rendered possible to the driver without, however, requiring him to look at the shifting lever very carefully and to exactly see they same.

The present invention essentially consists in that a shifting knob provided with a unilateral peripheral mark which may be sensed by the driver is rotatably supported and constructed to be selectively moved into different positions by a detent mechanism, is arranged within easy reach of the actuating person and, for purposes of transmission of the different positions thereof, is connected either directly or indirectly, with the change-speed transmission.

An embodiment is preferred in accordance with the present invention according to which the shifting knob having an essentially circular form or shape is of such size and configuration as to be readily handled manually without difficulty, and is provided with a unidirectional nose portion, with a raised portion or with an indented portion constituting the particular mark. However, an illuminating body or device may also be provided, either exclusively or additionally, in the nose portion or raised portion of the shifting knob.

In connection with the installation according to the present invention, it is also possible in darkness, alone by taking hold of the shifting knob, to sense the adjusted angular position thereof. A faulty shifting as a result of lack of recognition of the engaged speed or, for example, as a result of the erroneous selection or pushing of one of the buttons is, therefore, excluded ab initio. Furthermore, getting caught or hung up at the shifting lever with a sleeve or another part of the clothing is also made impossible for all practical purposes with a shifting knob according to the present invention of essentially smooth contour. Moreover, even if a certain part of the clothing should get stuck at the shifting knob, this, under no circumstances, would result in movement of the shifting knob and therewith in an unintentional shifting of the transmission.

The shifting knob in accordance with the present invention is appropriately provided with an automatic or possibly also with a selectively actuatable detent mechanism so that it may be retained in several positions by the detent mechanism, appropriately for example, in four positions displaced with respect to each other by 90°. The nose portion provided for purposes of recognition may simultaneously serve as pressure member for releasing the detent mechanism. The coordination of the shifting positions of the transmission to the different detent positions may be of any suitable desired arrangement. It may, for example, be of advantage to place the neutral speed with the shifting knob pointing upwardly, i.e., in the position in which the nose portion of the shifting knob points upwardly. A low speed is then placed appropriately toward the right, the normal driving range with the automatically engageable speeds downwardly and the reverse speed toward the left. This distribution may be changed if a parking position is to be incorporated or also, for example, if several more speeds or speed ranges are to be included in the shifting arrangement. For example, a displacement of each shifting position by 60° may also be appropriate.

The shifting knob is to be so arranged and disposed as to be readily grasped or seized manually. The shifting knob is so oriented with respect to the driver of the vehicle that the rotational axis of the knob extends generally in the longitudinal direction of the vehicle and toward the position normally occupied by the driver. Consequently, the shifting knob may be appropriately arranged at the steering column centrally above the steering wheel. A further possibility in accordance with the present invention consists in that the shifting knob is constructed of annular shape and is disposed rotatably as a ring or the like below the steering wheel about the steering column. Finally, It is also possible to rotatably mount the shifting knob at the dashboard, and more particularly, as closely adjacent to the steering wheel as possible.

In order to enable a convenient actuation of the shifting knob, the latter must not be too large. It must readily lie within the palm of the driver so that it may be completely surrounded when being grasped or seized. A smaller construction might be possible. It is particularly of importance if an auxiliary force is interconnected in the shifting actuating mechanism or an automatic transmission is provided.

The transmission of the shifting movement of the knob to the shifting arrangement of the transmission may take place directly. For that purpose, the shifting knob may be connected by a rotatable shaft, possibly by the interconnection of joints and/or linkages, with the shifting arrangement of the transmission. The shaft in turn may be flexible or may be constructed rigid. A further embodiment provides at the shifting knob a steep thread cooperating with a corresponding nut member by means of which a longitudinal movement is produced which is then transferred by a linkage, a Bowden cable or the like connected with the nut member to the shifting arrangement of the transmission.

The present invention is provided primarily for an indirect operation of the automatic transmission by an auxiliary force controlled by the shifting knob. As auxiliary force, an electric hydraulic, or pneumatic control may be interconnected in the shifting actuating mechanism.

It may also be appropriate to lock the shifting knob by a locking device, for example, by a centrally disposed lock against any unauthorized actuation. It may thereby serve simultaneously also as exclusive or additional safety device against theft whereby it may be particularly appropriate to be able to lock the same in any position, i.e., also with an engaged speed or range of speed.

Accordingly, it is an object of the present invention to provide an arrangement for shifting change-speed transmissions which may be readily actuated by the driver without requiring any special attention on his part.

Another object of the present invention is to provide an arrangement for actuating the shifting mechanism of a transmission, for example, of an automatic transmission, which is simple in construction, may be readily handled by the driver without diverting his attention from the road, and which enables a faultness shifting.

Another object of the present invention resides in the provision of a shifting device which entails greater safety in the operation thereof insofar as the driver and operation of the vehicle is concerned by permitting the driver to continue to concentrate on the traffic and road ahead.

Another object of the present invention is the provision of a shifting member or mechanism which enables the driver to obtain at all times a completely satisfactory indication of the particular speed engaged at that time.

A further object of the present invention is the provision of a shifting arrangement which is so arranged and constructed as not to be in the way of the clothes of the passengers or driver. Thereby unintentional actuation thereof when a part of the clothing of the driver gets caught thereon or even tearing of the clothing of the driver, is prevented.

These and other objects, features and advantages of the present invention will become more obvious from the following description, when taken in connection with the accompanying drawing, which shows, for purposes of illustration only, several embodiments in accordance with the present invention, and wherein.

Figure 1:
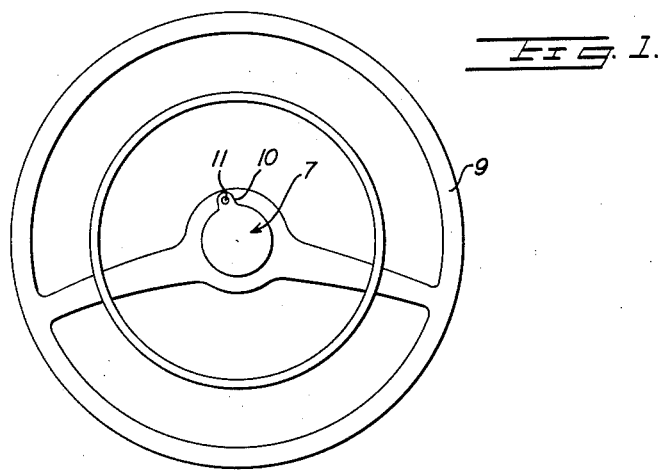
FIGURE 1 is an elevational view, looking down upon the steering wheel, of a shifting knob arrangement in accordance with the present invention.

Referring now to the drawing, wherein like reference numerals are used throughout the various views to designate like parts, and more particularly to FIGURE 1, reference numeral 7 designates generally the shifting knob which is arranged centrally on the steering column 8 above the steering wheel 9. The shifting knob 7 is constructed as an essentially round, slightly protruding knob which is provided with a lateral peripheral nose portion 10 changing the uniform circular contour thereof. An illuminating body 11, such as a small lamp, is arranged in the nose portion 10 which makes it possible to recognize also optically the position of the shifting knob 7 in addition to the recognition thereof by sensing the position of the nose portion 10. However, the nose portion 10 makes it possible for the driver to recognize, also without the illuminating device 11, instantaneously and automatically, so to speak, the position of the knob by seizing or grasping the knob and therewith to recognize the shifting position thereof, i.e., the particular engaged speed or speed range.

According to the embodiment of FIGURE 2, an annular shifting knob 12 is rotatably supported in a ring-like manner about the steering column 8 below the steering wheel (not illustrated). A notch or indentation 13 is provided as recognition mark in the shifting knob 12. However, if so desired, an additional illuminating body may also be arranged therein. An electric incandescent lamp or also the use of an illuminated colored reflecting body may possibly be used as an illuminating body for position recognition.

Figure 3:
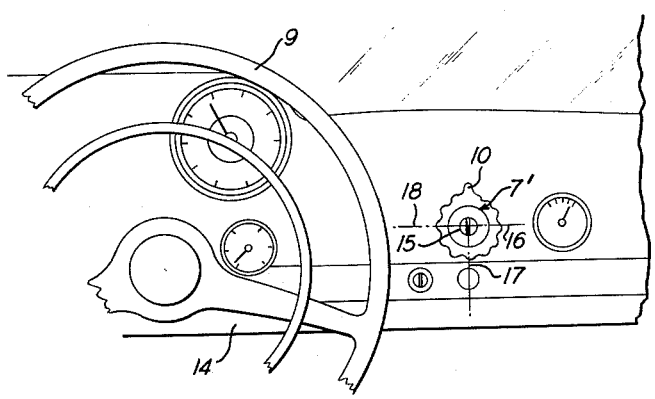
FIGURE 3 is an elevational view looking upon the steering wheel and dashboard of a motor vehicle showing still another embodiment of a shifting arrangement in accordance with the present invention.

According to FIGURE 3, a shifting knob generally designated by reference numeral 7' is rotatably arranged at the dashboard 14 of the vehicle which shifting knob may correspond in principle to that of FIGURE 1. The shifting knob 7' is arranged as close to the steering wheel 9 as possible. A lock 15 is provided centrally in the shifting knob 7' by means of which the shifting knob may be secured or locked in any predetermined or in all positions against all unauthorized rotation thereof. A combination with the ignition lock is also possible.

The position indicated in FIGURE 3, for example, may correspond to neutral. The low speed of the transmission would then correspond to the position 16, i.e., with the nose portion 10 directed toward the right as viewed in FIGURE 3. The position 17 would correspond to the normal driving range of the transmission with the speeds shifted automatically and the position 18 would correspond to the reverse speed.

Figure 2:
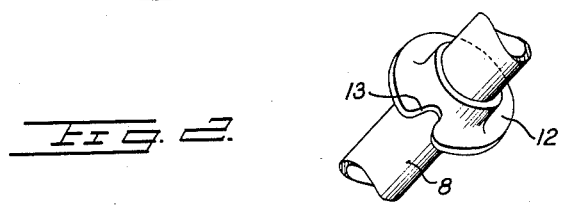
FIGURE 2 is a perspective view of a second embodiment of a shifting arrangement in accordance with the present invention.

The securing of the shifting knob in the aforementioned positions takes place by means of a suitable detent mechanism, not illustrated in FIGURES 1 to 3. The detent mechanism may be of any conventional construction and may be actuated, for example, either automatically or selectively. In the latter case, it is appropriate for the nose portion 10 to serve simultaneously as pressure member for releasing the detent mechanism.

The arrangement of the positions corresponding to the particular engaged transmission speeds and possibly also the detent mechanism in the embodiments illustrated in FIGURES 1 and 2 may be the same as in FIGURE 3.

Figure 4:
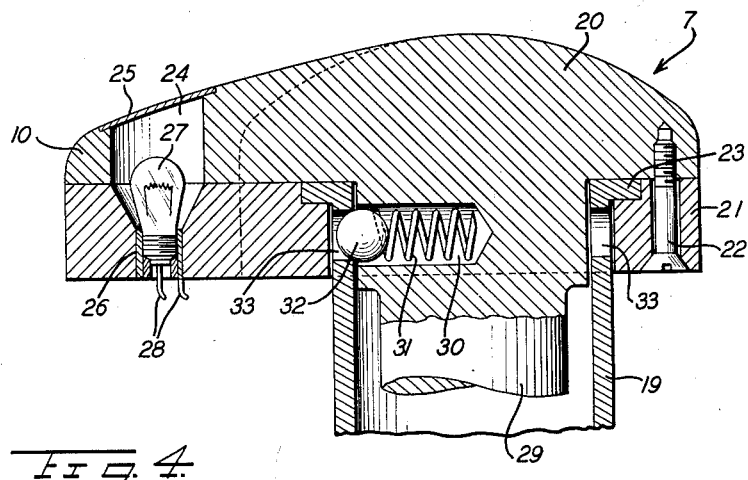
FIGURE 4 is an axial cross-sectional view through a first embodiment of a shifting knob in accordance with the present invention.

According to the embodiment of FIGURE 4, the shifting knob 7 is arranged on a sleeve or bushing-like tubular support member 19 which is non-rotatably arranged and rigidly secured at the vehicle. The shifting knob 7 is formed of two parts and consists of the top part 20 and the counter-ring part 21. The counter-ring part 21 is connected by means of bolts 22 or in any other suitable manner with the top part 20. A flange portion 23 of the tubular support member 19 is enclosed between top part 20 and counter-ring part 21, whereby the shifting knob 7 is secured in the axial direction thereof.

A lateral peripheral nose portion 10 is provided at the top part 20 and at the counter-ring part 21 constituting the shifting knob mark. A bore 24 is arranged within the top part 20 in the nose portion 10 which is covered by a transparent pane 25. At the corresponding place, a socket 26 for an incandescent lamp 27 is embedded in the counter-ring part 21. The connecting wires conducting the current to the lamp from the electric power source (not shown) may be connected with the socket terminals or lead wires 28.

A central projection 29 is provided at the top part 20 with which a rotatable shaft (not shown) is operatively connected within the tubular support member 19. The rotatable shaft serves for purposes of transmitting the movement of the shifting knob 7 to the shifting arrangement of the transmission. In the upper part of the projection 29 is provided a transversely arranged bore 30 in which a ball member 32 which is spring-loaded by a spring 31 is accommodated as detent body. The ball member or detent member 32 engages the bores 33 provided in the tubular support member 19 and thereby holds the shifting knob 7 in the individual shifting positions thereof.

Figure 5:
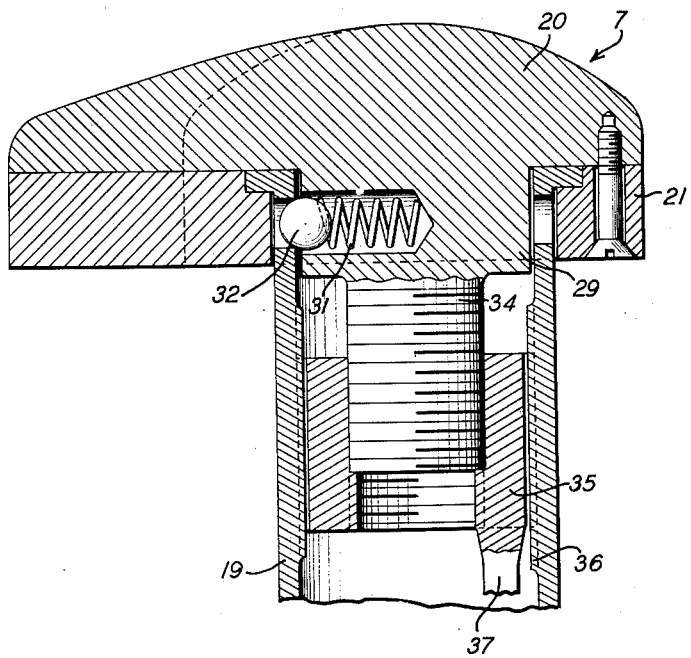
FIGURE 5 is an axial cross-sectional view through a second embodiment of a shifting knob in accordance with the present invention.

FIGURE 5 shows an arrangement which is essentially similar in principle to that of FIGURE 4. However, the shifting knob 7 thereof is not provided with an illuminating body in the nose portion 10 thereof, though such may be used, if so desired. A pin 34 provided with a steep thread is arranged at the central projection 29. The steep thread of the pin 34 engages with a nut member 35 having a corresponding internal threaded portion, the nut member 35 being guided along key members 36 of the tubular support member 19 in the manner of a splined connection so as to be non-rotatable but axially displaceable. A draw or pull linkage 37 is secured to the nut member 35 which serves for purposes of transmission of the shifting movement from nut member 35 to the shifting arrangement of the transmission. The rotation of the shifting knob is thereby converted in this embodiment into longitudinal movement. In the place of a linkage 37, a Bowden cable or any other suitable linkage may be connected with the nut member 35.

Figure 6:
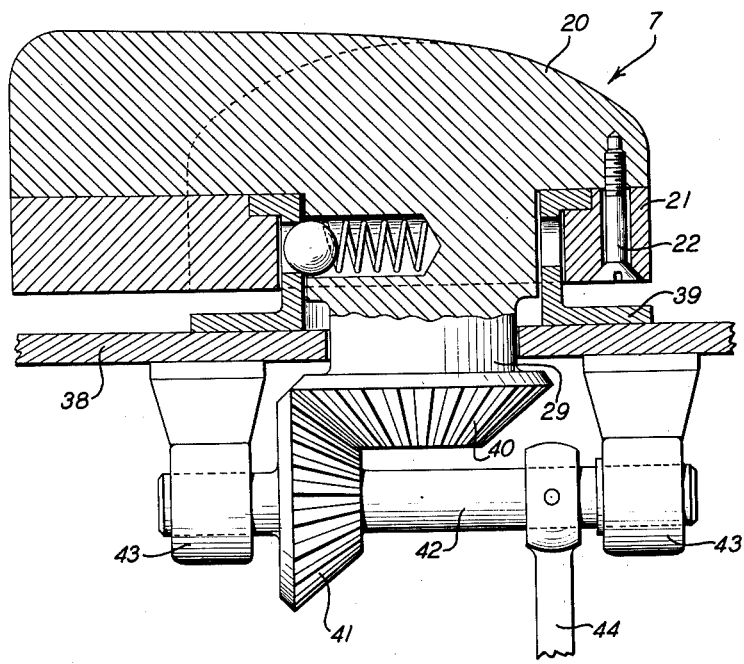
FIGURE 6 is an axial cross-sectional view through still another embodiment of a shifting knob in accordance with the present invention.

FIGURE 6 illustrates a different possibility for the construction of the transmission means for the shifting movement while maintaining in principle the same arrangement and construction of the shifting knob itself, the lateral nose portion 16 thereof being constructed in a wing-like manner without illuminating body.

The shifting knob 7 is supported on a base plate 38 which, of example, may be constituted by the dashboard of the vehicle (FIGURE 3) by means of a sleeve having a relatively short flange 39 in the manner already described hereinabove. A bevel gear 40 is secured at the central projection 29 thereof which cooperates with a further bevel gear 41 mounted on a shaft 42 which is arranged in the two bearing lugs 43 disposed behind the base plate 38. A lever 44 is secured to the shaft 42, the movement of which is transmitted over any other suitable linkage (not illustrated) to the shifting arrangement of the transmission.

From an inspection of FIGURES 1 and 3, it will be apparent that the shifting knob 7 is arranged with its rotatable axis extending generally longitudinally of the vehicle with the essentially circular knob presenting a generally smooth essentially circular outer surface transversely of this rotational axis and facing the position normally occupied by the vehicle driver. Moreover, as will be evident from FIGURES 4 and 6, the peripheral portions of the knob which are to be grasped by the driver's fingers, except at the mark means, are generally equally distant from the rotational axis and extend radially outwardly beyond the outer surface of the supporting sleeve and further extend a substantial distance axially of the knob so as to be firmly graspable by one hand of the driver to rotate the knob while his palm generally overlies the aforementioned outer surface which faces the driver.

While I have shown and described several embodiments of the shifting knob as well as of the locations and mounting thereof within the vehicle, it is understood that the present invention is not limited thereto, but is susceptible of many modifications and changes within the scope of the present invention. Each of the particular embodiments of FIGURES 4 through 6 may be used with the arrangement of FIGURES 1 and 3, while a shifting ring analogous to the shifting knobs of FIGURES 4 through 6 provided with a hollow projection 29 may be used in connection with FIGURE 2. Suitable illuminating bodies may or may not be used with any of the actuating knobs.

Thus, the present invention is susceptible of many changes and modifications and I intend to cover all such changes and modifications as encompassed by the appended claims.

I claim:

1. An arrangement in a motor vehicle for actuating a shiftable change speed transmission especially the range selector for automatic transmissions of motor vehicles, comprising an essentially circular shifting knob means rotatable about a predetermined axis of rotation and provided with unilateral peripheral mark means which may be manually sensed by the driver of the vehicle to indicate the adjusted angular position of said knob means, a non-rotatable and rigid supporting sleeve coaxial with said knob means, means for supporting said knob means on and at one end of said sleeve and for restricting movement of the knob means relative to said sleeve exclusively to rotation about said axis, said knob means having peripheral grasping surface portions on all sides of said axis and at substantially the same distance therefrom except at said mark means and extending outwardly therefrom radially beyond the outer surface of said sleeve and a substantial distance axially of said knob means to be firmly graspable by one hand of the driver for rotating said knob means, resiliently biased detent means connected to said knob means and movable therewith, said detent means and said sleeve being so constructed and arranged and relatively cooperating to hold the shifting knob means in predetermined different positions about said axis, connecting means connected to said shifting knob means and extending through said sleeve and including a mechanical structure movable to different positions corresponding to said predetermined angular positions of the knob means for operating the change speed transmission to select a speed range thereof corresponding to a selected position of said shifting knob means, the axis of rotation of the knob means extending generally in the longitudinal direction of the vehicle, said knob means presenting a generally smooth essentially circular outer surface transversely of said axis and facing the position normally occupied by a vehicle driver.

2. An arrangement according to claim 1, wherein said connecting means includes cooperating threaded pin and nut members one of which is connected for rotation with said knob means and the other of which is movable along said axis in response to rotation of the knob means for selecting the speed range of said transmission, said threaded pin and nut members having a steep thread to provide a corresponding increased movement of said other member longitudinally of said axis as said knob means rotates.

3. Apparatus according to claim 1, wherein said knob means includes a portion extending into said sleeve and having said detent means carried thereby and extending radially outwardly from said portion to engage an inner surface of said sleeve.

4. An arrangement in a motor vehicle for actuating a shiftable change speed transmission, especially the range selector for an automatic motor vehicle transmission, comprising steering wheel means having a predetermined axis of rotation, an essentially circular shifting knob means rotatable coaxially of said steering wheel means, and having unilateral peripheral mark means which may be manually sensed by the driver of the vehicle to indicate the adjusted angular position of said knob means, a non-rotatable and rigid supporting sleeve coaxial with said knob means, means for supporting said knob means on and at one end of said sleeve and for restricting movement of the knob means relative to said sleeve exclusively to rotate about said axis, said knob means having peripheral grasping surface portions on all sides of said axis and at substantially the same distance therefrom except at said mark means and extending outwardly therefrom radially beyond the outer surface of said sleeve and a substantial distance axially of said knob means to be firmly graspable by one hand of the driver for rotating said knob means, resiliently biased detent means connected to said knob means and movable therewith, said detent means and said sleeve being so constructed and arranged and relatively cooperating to hold the shifting knob means in predetermined different positions about said axis, connecting means connected to said shifting knob means and extending through said sleeve and including a mechanical structure movable to different angular positions corresponding to said predetermined positions of the knob means for operating the change speed transmission to select a speed range thereof corresponding to a selected position of said shifting knob means, the axis of rotation of the knob means extending generally in the longitudinal direction of the vehicle, said knob means presenting a generally smooth essentially circular outer surface tranversely of said axis and facing the position normally occupied by a vehicle driver.

5. Apparatus according to claim 4, wherein said connecting means extends through said steering wheel means and wherein said knob means is arranged at the side of said steering wheel facing the driver.

References Cited in the file of this patent
UNITED STATES PATENTS

| | | |
|---|---|---|
| 620,124 | Hassis | Feb. 28, 1899 |
| 1,007,673 | Coffin | Nov. 7, 1911 |
| 1,238,912 | Hilbers | Sept. 4, 1917 |
| 1,449,900 | Howard et al. | Mar. 27, 1923 |
| 1,484,729 | McCain | Feb. 26, 1924 |
| 1,498,859 | Wekerle | June 24, 1924 |
| 1,746,887 | Douglas | Feb. 11, 1930 |
| 1,760,347 | Craig | May 27, 1930 |
| 1,817,036 | Kearney et al. | Aug. 4, 1931 |
| 1,835,631 | Bradley | Dec. 8, 1931 |
| 1,862,692 | Marles | June 14, 1932 |
| 1,992,901 | McIntosh | Feb. 26, 1935 |
| 2,056,549 | Weinberg | Oct. 6, 1936 |
| 2,151,376 | Eastin | Mar. 21, 1939 |
| 2,543,389 | Van Lennep | Feb. 27, 1951 |
| 2,688,299 | Gload et al. | Sept. 7, 1954 |
| 2,811,870 | Rogers | Nov. 5, 1957 |

FOREIGN PATENTS

| | | |
|---|---|---|
| 550,873 | France | Dec. 22, 1922 |